(12) United States Patent
Anderson et al.

(10) Patent No.: US 8,582,228 B2
(45) Date of Patent: Nov. 12, 2013

(54) LOCKING MEDIA PUSHER

(75) Inventors: Ronald E. Anderson, Lakeville, MN (US); James H. McGlennen, Eden Prairie, MN (US); Brett R. Herdendorf, Mound, MN (US)

(73) Assignee: Seagate Technology, Cupertino, CA (US)

( * ) Notice: Subject to any disclaimer, the term of this patent is extended or adjusted under 35 U.S.C. 154(b) by 378 days.

(21) Appl. No.: 13/024,887

(22) Filed: Feb. 10, 2011

(65) Prior Publication Data

US 2012/0207005 A1 Aug. 16, 2012

(51) Int. Cl.
*G11B 21/12* (2006.01)
*G11B 27/36* (2006.01)

(52) U.S. Cl.
USPC .......................................... 360/75; 369/53.41

(58) Field of Classification Search
None
See application file for complete search history.

(56) References Cited

U.S. PATENT DOCUMENTS

| | | | | |
|---|---|---|---|---|
| 5,572,505 A | * | 11/1996 | Llewellyn | 720/696 |
| 5,975,839 A | * | 11/1999 | Ashby | 414/798.1 |
| 6,421,199 B1 | * | 7/2002 | McKenzie et al. | 360/77.04 |
| 6,566,870 B2 | | 5/2003 | Sorenson et al. | |
| 6,655,244 B2 | * | 12/2003 | Shiraishi et al. | 82/1.11 |
| 6,839,956 B2 | * | 1/2005 | Watanabe et al. | 29/603.03 |
| 6,947,244 B2 | * | 9/2005 | Kawaguchi et al. | 360/75 |
| 8,077,426 B2 | * | 12/2011 | Guzik et al. | 360/75 |

* cited by examiner

*Primary Examiner* — K. Wong
(74) *Attorney, Agent, or Firm* — Braden Katterheinric

(57) ABSTRACT

A locking media pusher is coupled to a servo controlled stage and includes a protruding probe and a locking mechanism. The stage moves forward and backward along a base toward and away from a storage medium. If an eccentricity of a track on the storage medium exceeds a threshold, the storage medium is rotated to an orientation where the greatest eccentricity is directed toward the media pusher. The media pusher is moved toward the storage medium until a probe extending from the media pusher contacts the storage medium. The probe is locked within the media pusher. The stage and attached media pusher are retracted from the storage medium and the storage medium is unlocked. The magnitude of retraction of the stage is recorded. The stage is moved toward the storage medium a distance corresponding to the probe contact position plus the eccentricity magnitude to correct the eccentricity.

8 Claims, 4 Drawing Sheets

LOCKING MEDIA PUSHER

SUMMARY

Implementations described and claimed herein provide for a locking media pusher. In one implementation, the locking media pusher includes a protruding probe configured to slide along an axis within the locking media pusher and locate an edge of a storage medium and a locking mechanism configured to fix the position of the protruding probe along the axis within the locking media pusher.

In another implementation, a method for aligning a track on a storage medium with an axis of rotation of the storage medium is described and claimed herein. The method includes measuring a magnitude of eccentricity of the track on the storage medium, determining a media contact position at an edge of the storage medium using a protruding probe, and advancing the protruding probe in a radial direction toward a spinning axis of the storage medium an amount approximately equal to the eccentricity of the track to align the track on the storage medium with the axis of rotation of the storage medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
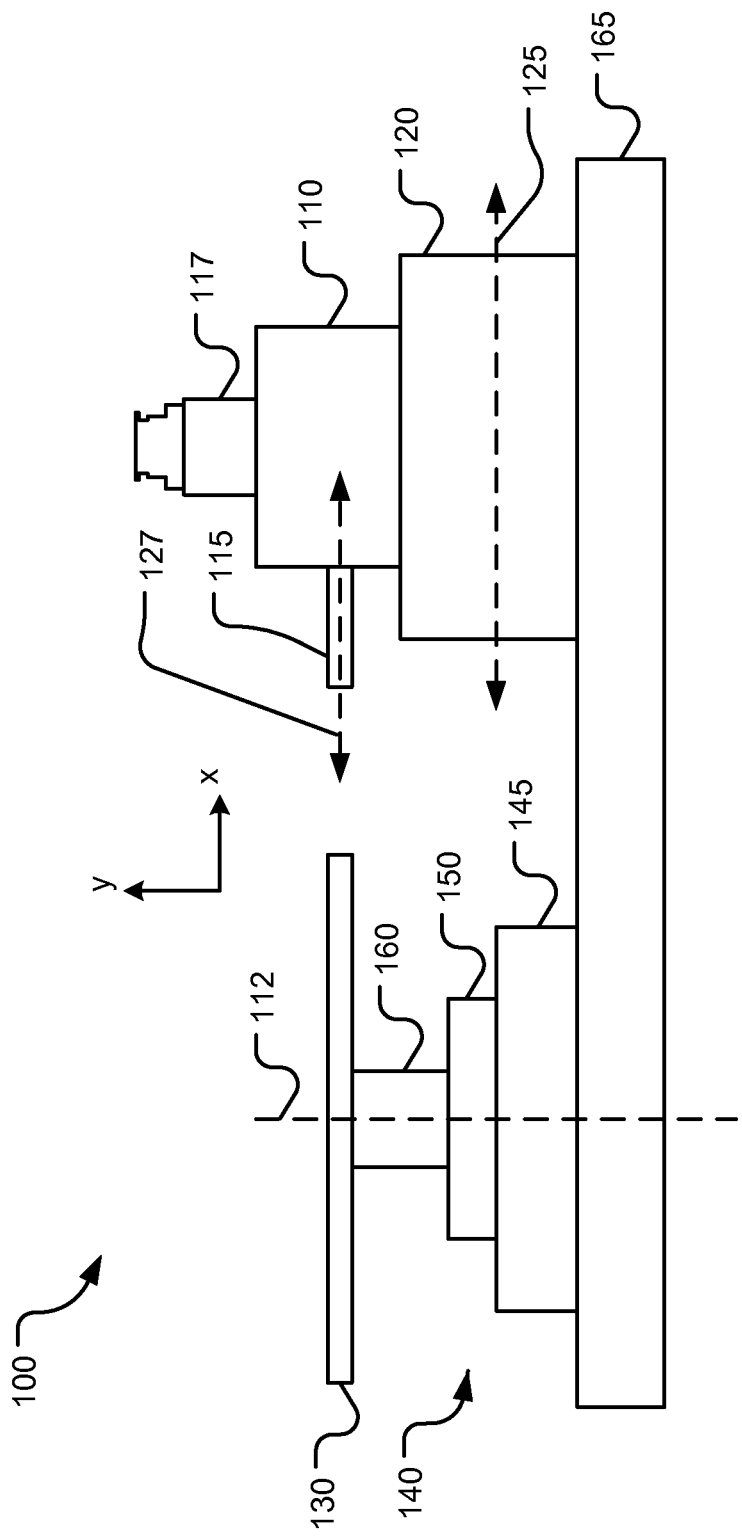
FIG. 1 illustrates an example track alignment system.

Storage devices, such as hard disc drives, are tested extensively during manufacturing to ensure that the storage devices meet performance criteria. In hard disc drives, the performance of one or more transducer heads is tested on a storage medium. A magnetic pattern, such as a servo pattern, may be pre-written on the storage medium to provide information about the radial position of a track on the storage medium and the position of the transducer head on the track. This position information can be feed back to a control system. The control system can provide a signal to drive an actuator, which controls the orientation of the transducer head with respect to the tracks on the storage medium, enabling the transducer to follow trajectory relative to the servo pattern written on the storage medium.

The storage medium often is evaluated on a test system different from the system that put the servo pattern in place. It is assumed that no two systems have exactly the same circumferential path relative to axis of rotation of the spindle to which the storage medium was attached during the writing process and the servo pattern is not necessarily placed concentric to the physical edges of the storage medium. When the storage medium is mounted to a different test system, the nominal track centers will appear eccentric (defined below) due to the difference in the track central axis and the rotation axis of the storage medium. Further, there may be circularity error differences between the writing system and test system. Typically the stroke of the actuator moving the transducer in the test system is much less than the full stroke required to access all the tracks on the storage medium and typically less than the aforementioned eccentricity. The eccentricity, in many cases, must be reduced prior to further testing of the storage medium and/or transducer head.

Eccentricity refers to herein a center of rotation of one or more circular or nearly circular tracks (also the rotation axis of a motor to which a corresponding storage medium is attached) on the storage medium not coincident with a geometric center of the tracks. The aforementioned alignment accounts for the eccentricity of the magnetic tracks with respect to the axis of rotation of the storage medium. However, it is difficult to adjust for the eccentricity of the magnetic tracks without significantly disturbing the position of the media in the test system.

One way to measure the magnitude and direction of eccentricity of the storage medium is to demodulate a pre-written circumferential servo pattern aligned with data tracks on the storage medium. Characteristic of most servo patterns is a servo index mark, which signifies a specific circumferential position of the servo pattern. In one implementation, the spindle to which the storage medium is attached has a spindle index indicator that pulses once per revolution of the storage medium. The physical relationship of the spindle index indicator is fixed relative to a transducer head. As the storage medium rotates, a signal produced by the transducer head repeatedly passing over the servo index mark is compared to a signal produced by the spindle index indicator. The duration of this relative measurement can be scaled by the rotation rate of the storage medium to compute the circumferential position of the servo index mark relative to the spindle index indicator. The servo index mark can then be used to track a circumferential position of the transducer head relative to the storage medium at any moment in time.

The transducer head remains stationary as the storage medium is rotated. The transducer head outputs a position error signal indicating a magnitude of distance the pre-written circular pattern varies from the initially aligned position as well as a radial position of the storage medium as it is rotated (as discussed above). The position error signal is then used to calculate the maximum magnitude of eccentricity along with its position on the storage medium with respect to the servo index mark on the medium. In one implementation, the position of the transducer head relative to the storage medium can be related to the physical geometry of the test system.

Once the eccentricity magnitude and direction are known, a locking media or disc pusher, as presently disclosed, may push the storage medium with respect to the axis of rotation of the storage medium to correct the storage medium eccentricity. For example, the direction of greatest storage medium eccentricity may be pointed toward the locking media pusher. The storage medium is unlocked with respect to the axis of rotation and the locking media pusher pushes the storage medium radially with respect to the axis of rotation by the known storage medium eccentricity. The storage medium is re-locked with respect to the axis of rotation and should have less or no eccentricity.

FIG. 1 illustrates an example track alignment system 100. In the track alignment system 100, a locking media pusher 110 is coupled to a servo controlled stage 120. The locking media pusher 110 includes a protruding probe 115 and a locking mechanism 117. The servo controlled stage 120 is configured to move forward and backward along a base 165 toward and away from a storage medium 130 along stage axis of movement 125 (i.e., in the x-direction and negative x-direction). The storage medium 130 storing a pre-written magnetic pattern, such as a servo pattern, is clamped to a spindle stack 140 using a media clamp 160. Also included in the spindle stack 140 is a spindle motor 145 that rotates the storage medium 130 about an axis of rotation 112. In one implementation, the media clamp 160 is attached to the spindle motor 145 using a mounting flange 150. In various implementations, the storage medium 130 is a magnetic and/or optical storage disc.

In track alignment system 100, a magnitude and a direction of eccentricity of the magnetic track of the storage medium 130 is determined by, for example, demodulating the pre-written pattern on the storage medium 130. With the storage medium 130 clamped to the spindle stack 140 via the media clamp 160, the storage medium 130 is rotated about the axis of rotation 112 such that the highest magnitude of eccentricity is directed towards the locking media pusher 110 coupled to the servo controlled stage 120. The servo controlled stage 120 is configured to move in a controlled fashion toward and away from the storage medium 130 along the stage axis of movement 125.

A precise position of the servo controlled stage 120 on the base 165 is measureable using any precision linear distance measuring device (not shown). For example, the linear distance measuring device may include a linear encoder, linear variable differential transformer, and/or optical probe. Further, the linear distance measuring device may be attached to or independent of the servo controlled stage 120 and/or base 165. In one implementation, a rule is attached to the base 165 and the position of the servo controlled stage 120 is tracked with reference to the rule either electronically or visually.

In an implementation, the servo controlled stage 120 moves toward the axis of rotation 112 of the storage medium 130 until protruding probe 115 contacts the storage medium 130. The protruding probe 115 is configured to retract within the media pusher 110 along probe axis of movement 127 (i.e., in the x-direction and negative x-direction) when the protruding probe 115 contacts the storage medium 130 with low static friction and fixed dynamic friction. Thus, once the protruding probe 115 contacts the storage medium 130, the protruding probe 115 ceases to move toward the storage medium 130, even if the servo controlled stage 120 continues to move toward the storage medium 130. As a result, the edge of the storage medium 130 is detected using the protruding probe 115 without significantly disturbing the position of the storage medium 130 relative to the remainder of the spindle stack 140.

In an implementation, the protruding probe 115 has a fixed dynamic friction when moving along probe axis of movement 127. More specifically, the fixed dynamic friction dampens the protruding probe 115 as it retracts into the locking media pusher 110. As a result, the protruding probe 115 resists changes in position which allows it to maintain precise contact with the storage medium 130 while the protruding probe 115 retracts into the locking media pusher 110. Further, the protruding probe 115 has a low static friction when moving along the probe axis of movement 127, which minimizes changes in force applied to the storage medium 130 by the protruding probe 115. Thus, the contact position between the protruding probe 115 and the storage medium 130 is repeatable and the protruding probe 115 does not cause the spindle stack 140 holding the storage medium 130 and/or the storage medium 130 itself to significantly deflect. The fixed dynamic friction and low static friction are discussed in more detail with regard to FIG. 3 below.

Once the servo controlled stage 120 stops moving toward the storage medium 130, the locking mechanism 117 of the locking media pusher 110 fixes the position of the protruding probe 115. The precise location of the edge of the storage medium 130 can then be recorded as a media contact position using the position of the servo controlled stage 120 with respect to the base 165. Once the precise location of the edge of the storage medium 130 is determined, the servo controlled stage 120 and locking media pusher 110 are retracted, and the media clamp 160 is released. The servo controlled stage 120 may then be moved toward the axis of rotation 112 of the storage medium 130 to the recorded media contact position plus the pre-determined magnitude of eccentricity of the pre-written tracks, moving the storage medium 130 into alignment with the rest of the spindle stack 140. More specifically, the storage medium 130 becomes more concentric with the rest of the spindle stack 140. The storage medium 130 can then be clamped or fixed in the aligned position using the media clamp 160, and the servo controlled stage 120 can be retracted. This process may be iteratively repeated to obtain a better aligned storage medium 130. Testing of the transducer head and/or storage medium may then proceed. In one implementation, the locking media pusher 110 is able to make an adjustment of the storage medium 130 relative to the axis of rotation 112 independent of the precise location of the edge of the storage medium 130 on the track alignment system 100.

Figure 2:
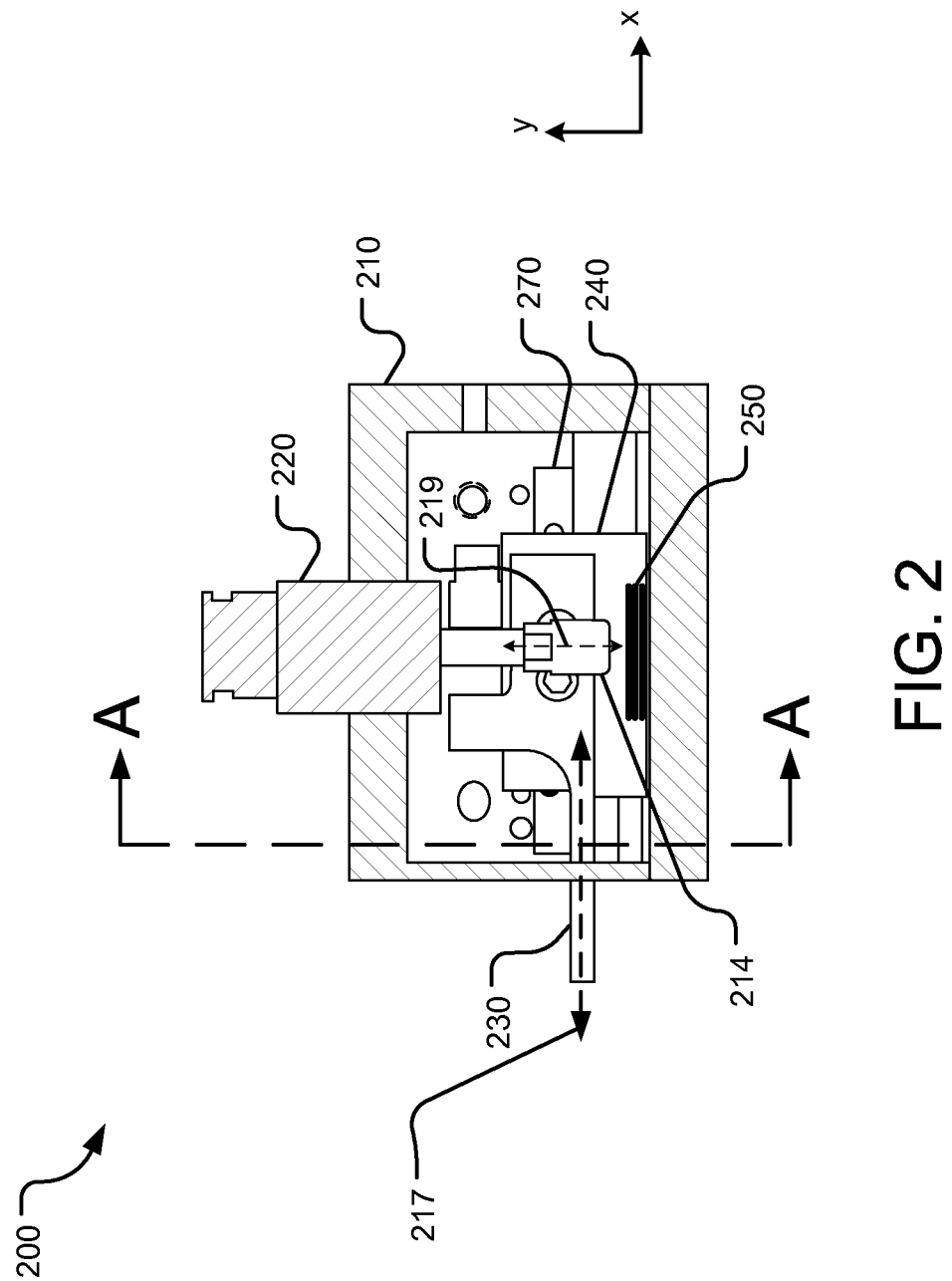
FIG. 2 illustrates a side cross-sectional view of an example locking media pusher.

FIG. 2 illustrates a side cross-sectional view of an example locking media pusher 200. A protruding probe 230 extends beyond a housing 210 of the locking media pusher 200. The protruding probe 230 is coupled to a slide carriage (shown in FIG. 3) that slides along a slide rail 270 along probe axis of movement 217 (i.e., generally in the x-direction and negative x-direction). The interface between the slide carriage and the slide rail 270 is configured to have a low static friction and a fixed dynamic friction (see discussion with regard to FIGS. 1 and 3).

Low static friction minimizes changes in force against a storage medium (not shown) and permits a repeatable contact position between the protruding probe 230 and the storage medium. With the resolution desired in some implementations of the presently disclosed technology (e.g., <0.000025"), even very small changes in force against the storage medium can deflect the storage medium and/or storage medium mounting structure (e.g., a spindle stack). Fixed dynamic friction permits the protruding probe 230 to maintain precise contact with a storage medium while the slide carriage is sliding along the slide rail 270 without applying unnecessary additional force against the storage medium.

When the protruding probe 230 contacts the storage medium, which is stationary and fixed to a spindle stack (not shown), the protruding probe 230 slides along the slide rail 270 and retracts along probe axis of movement 217 into the housing 210 of the locking media pusher 200. The position of the edge of the storage medium may be precisely determined by noting the position of the locking media pusher 200 with respect to a base (not shown) when the locking media pusher 200 comes to rest. In one implementation, an actuator (not shown) pushes the probe 230 out of the housing 210 prior to the protruding probe 230 contacting the storage medium.

Locking mechanism 220 fixes the position of the protruding probe 230 when movement of a servo controlled stage (not shown) attached to the media pusher 200 stops. In the implementation, the locking mechanism 220 includes a linear actuator with a piston 214 extending therefrom. The piston 214 extends along piston axis of movement 219 (i.e., generally in the negative y-direction) and presses braking components including a brake fin 240 and a brake clamp 250 against the interior bottom of the housing 210. Operation of the locking mechanism 220 and braking components is discussed in more detail with regard to FIG. 3.

Figure 3:
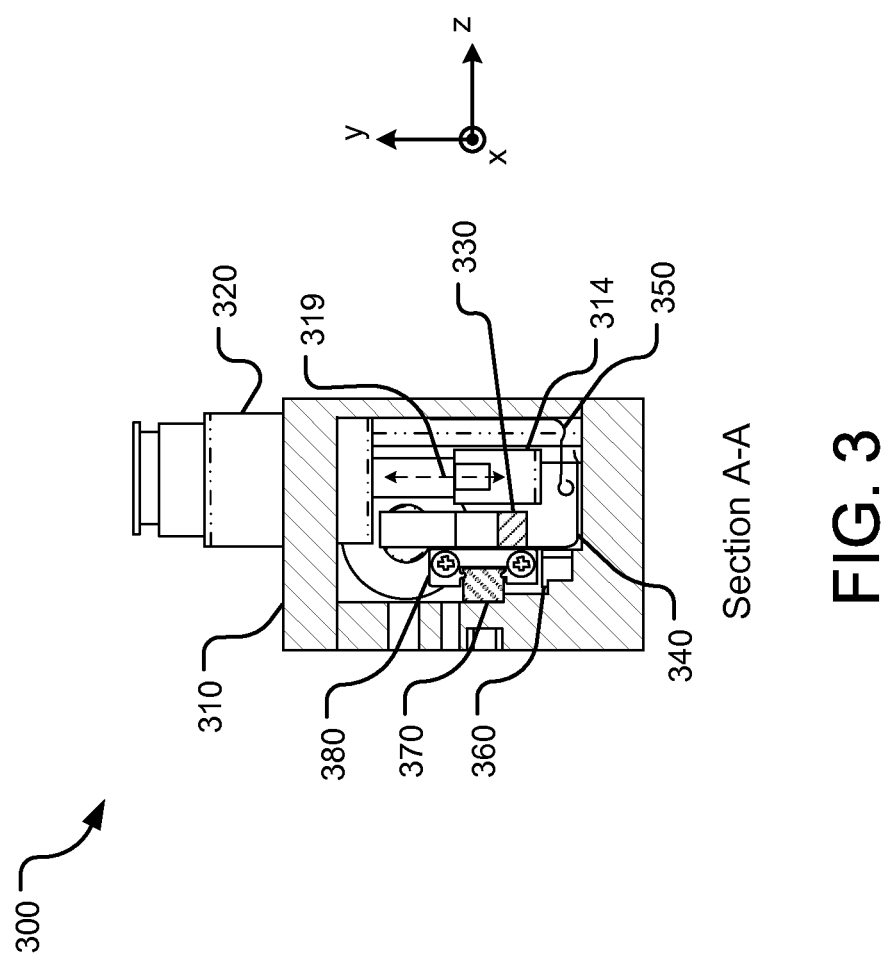
FIG. 3 illustrates cross-section A-A of the example locking media pusher of FIG. 2.

FIG. 3 illustrates cross-section A-A of the example locking media pusher 200 of FIG. 2. Slide carriage 380 is shown in a locking media pusher 300 fixedly attached to a protruding probe 330 and slideably attached to a slide rail 370. The slide carriage 380 moves linearly along the slide rail 370 and permits the protruding probe 330 to extend in and out of the locking media pusher 300 in the x-direction and negative x-direction (i.e., generally in and out of the page in FIG. 3).

A locking mechanism 320 fixes the position of the protruding probe 330 when movement of protruding probe 330 with respect to the slide rail 370 stops. A piston 314 of the locking mechanism 320 extends along piston axis of movement 319 (i.e., generally in the negative y-direction), pushing a brake clamp 350 (e.g., a first small leaf spring) against a brake fin 340 (e.g., a second small leaf spring), which in turn pushes against an interior bottom of a housing 310 of the locking media pusher 300. Frictional forces between the piston 314, brake clamp 350, brake fin 340, and housing 310 clamps the slide carriage 380 to the housing 310 and prevents the slide carriage 380 from moving with respect to the slide rail 370. In one implementation, the locking mechanism 320 is a solenoid-type locking mechanism. In other implementations, the locking mechanism 320 may be mechanically, pneumatically, or hydraulically activated.

The brake clamp 350 prevents translational motion in the x-direction of the protruding probe 330 during the locking process that may come from the piston 314. The brake fin 340 deflects in the negative y-direction and is pinched against the housing 310. In an implementation, an area of the housing 310 where the brake fin 340 comes in contact with the housing 310 may have texture or finish or may be covered with a material that creates sufficient static friction to hold the protruding probe 330 in place when the locking mechanism 320 is activated. In an implementation, the protruding probe 330 has a maximum stiffness in the direction it "pushes" the storage medium (i.e., the x-direction).

In addition, the brake clamp 350 and brake fin 340 are depicted relatively long in the x-direction (see FIG. 2) and relatively short in the z-direction (see FIG. 3). This spring orientation yields a locking mechanism that minimizes translation in the x-direction while allowing the brake clamp 350 and brake fin 340 to be relatively compliant in the z-direction and small enough to be packaged within the locking media pusher 200, 300. Minimizing translation in the x-direction while locking the protruding probe 330 is important so that the positions of the protruding probe 330 and/or storage medium are not disturbed by the locking process. For example, translation in the x-direction while locking the protruding probe 330 is limited to less than a micron.

In one implementation, a low friction damper 360 attached to the interior of the housing 310 is adjusted so that it creates a low static friction and a fixed dynamic friction of the protruding probe 330 in relation to the housing 310. More specifically, the damper 360 may be adjusted such that it is in contact with brake fin 340 with a small force. For example, the contact force of the damper 360 with the brake fin 340 is adjusted until the minimum force on the probe 330 to maintain motion of the probe 330 is a constant 0.02 lbs.+/−20%. This is the fixed dynamic friction component.

Further, the static friction component (i.e., the force required to defeat the static friction between the damper 360 and the brake fin 340 to initiate motion of the probe 330) is calibrated by choosing the materials, surface contact area, and/or surface characteristics of the damper 360 and the brake fin 340. In one implementation, the static friction component does not exceed the fixed dynamic friction component by more than 20% (e.g., 0.024 lbs.). Further, the materials and/or surface characteristics of the damper 360 and the brake fin 340 are also chosen to have a relatively low coefficient of friction and low wear characteristics.

Figure 4:
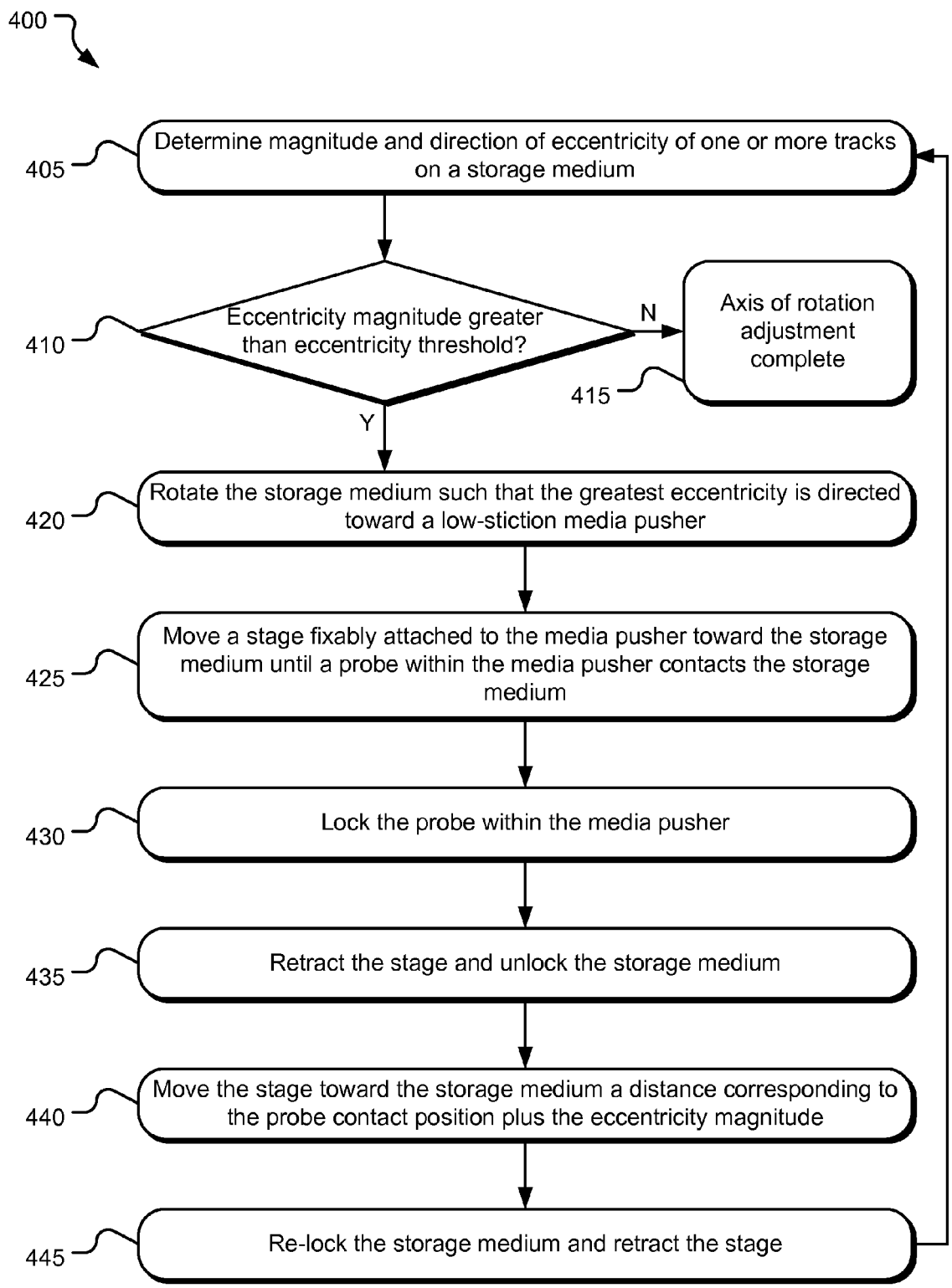
FIG. 4 illustrates example operations for aligning one or more tracks on a storage medium with an axis of rotation of the storage medium.

FIG. 4 illustrates example operations 400 for aligning one or more tracks on a storage medium with an axis of rotation of the storage medium. In a determining operation 405, magnitude and direction of eccentricity of one or more tracks on a storage medium is measured. In one implementation, the storage medium may be pre-patterned with a test track utilized specially for this operation. A read head may pass over the test track to detect the magnitude and direction of eccentricity of the test track. This and other known methods of detecting track eccentricity magnitude and direction may be used.

In a decision operation 410, a decision is made whether the measured magnitude of eccentricity is sufficient to warrant adjusting the axis of rotation of the storage medium. This decision may be made manually or automatically by comparing the measured eccentricity magnitude to a threshold magnitude. In an alternative implementation, the operations 400 (excluding operations 410 and 415) may be executed a predetermined number of times regardless of a threshold magnitude.

If the eccentricity does not exceed the threshold, as illustrated in operation 415, the axis of rotation adjustment is complete. If the eccentricity does exceed the threshold, operations 400 continue with rotation operation 420. In rotation operation 420, the storage medium is rotated to an orientation where the greatest eccentricity is directed toward a locking media pusher located in a radial direction from the axis of rotation of the storage medium. In a moving operation 425, a stage fixably attached to the media pusher is moved toward the storage medium until a probe extending from the media pusher contacts the storage medium. The probe is capable of retracting within the media pusher, allowing the stage to continue moving toward the storage medium even after the probe has contacted the storage medium. In one implementation, an actuator first extends the probe entirely or nearly entirely out of the media pusher so that when the probe contacts the storage medium, the probe has substantial stroke to extend inside the media pusher. The position where the stage stops is not important so long as the position where the stage stops is known and recorded.

In locking operation 430, the probe is locked within the media pusher using an actuator pressing one or more braking components against one another and/or against the interior housing of the media pusher. In some implementations, the actuator is mechanically, pneumatically, or hydraulically actuated. Further, in some implementations, the braking components include spring steel. In a retraction operation 435, the stage and attached media pusher is retracted from the storage medium and the storage medium is unlocked. The direction and magnitude of retraction of the stage is known, recorded, and used in moving operation 440. In one implementation, the storage medium is attached to a spindle for spinning about the axis of rotation. The spindle may be locked so that the storage medium cannot move in any direction or in directions other than rotation about the axis of rotation. The spindle may be unlocked so that the storage medium may be shifted in directions perpendicular to the axis of rotation.

In moving operation 440, the stage is moved toward the storage medium a distance corresponding to the probe contact position plus the eccentricity magnitude. For example, if in retraction operation 435, the stage and attached media pusher was retracted 10 mm and the magnitude of the eccentricity is 1 mm, the stage is moved toward the storage medium a magnitude of 11 mm in moving operation 440. As a result, the eccentricity of the storage medium is corrected. In locking operation 445, the storage medium is re-locked and the stage is retracted from the storage medium.

Operations 405 & 410 are repeated to determine if any remaining eccentricity exceeds the eccentricity threshold. If so, operations 420-445 are repeated. If not, the process ends with operation 415 as discussed above. The operations of FIG. 4 may be repeated iteratively one or more times with the aim of reducing disk eccentricity below the eccentricity threshold. In one example implementation, the operations of FIG. 4 are iteratively repeated 2-3 times to achieve the eccentricity threshold.

Certain implementations have been discussed with reference to a disc drive or other data storage device. One skilled in the art will recognize that the present invention may also be applied to any data storage device, such as a magnetic disk drive, an optical disc drive, a magneto-optical disc drive, a compact disc drive, a server, a personal computer, office equipment such as copiers and fax machines, or other data storage device. Further, a test system may comprise a processor operating instructions comprising software and/or firmware or may comprise logic or circuitry that provides a feedback used for determination of eccentricity and position.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A media pusher, comprising:
   a protruding probe configured to slide within the media pusher along a probe axis independently from movement of the media pusher, wherein the protruding probe is connected to a brake fin; and
   a locking mechanism configured to fix a position of the protruding probe along the probe axis within the media pusher by pressing a brake clamp against the brake fin, which presses against a media pusher housing to fix the protruding probe's position with respect to the media pusher housing.

2. The media pusher of claim 1, wherein the locking mechanism further includes a linear actuator configured to press the brake clamp against the brake.

3. The media pusher of claim 1, further comprising:
   a stage configured to move the media pusher along a stage axis substantially parallel to the probe axis.

4. The media pusher of claim 1, wherein the protruding probe is configured to have a fixed dynamic friction.

5. The media pusher of claim 1, wherein the protruding probe is connected to a slide carriage within the media pusher, wherein the slide carriage is configured to slide along a slide rail parallel to the probe axis within the media pusher.

6. The media pusher of claim 1, wherein a force requisite to slide the protruding probe within the media pusher is approximately 0.02 lbs.

7. A method for using a media pusher, the media pusher including a protruding probe configured to slide along a first axis independently of the media pusher, the method comprising:
   moving the media pusher along the first axis towards a storage medium, the first axis being aligned with a direction of maximum eccentricity of a track of the storage medium;
   contacting the storage medium with the protruding probe so that the protruding probe stops moving while the media pusher continues to move;
   measuring a magnitude and direction of maximum eccentricity of the track on the storage medium;
   after contacting the storage medium with the protruding probe, fixing a position of the protruding probe with respect to the media pusher; and
   after fixing the position of the protruding probe, pushing the storage medium an amount approximately equal to the maximum eccentricity of the track by further advancing the media pusher toward the storage medium along the first axis.

8. The method of claim 7, wherein the storage medium is un-locked from a spindle stack during or prior to the pushing operation.

* * * * *